(12) United States Patent
Wei et al.

(10) Patent No.: US 12,194,640 B2
(45) Date of Patent: Jan. 14, 2025

(54) AUTOMATED SOLAR FARM CONSTRUCTION

(71) Applicants: William T. Wei, Corona, NY (US); James Paul Demers, Brooklyn, NY (US)

(72) Inventors: William T. Wei, Corona, NY (US); James Paul Demers, Brooklyn, NY (US)

( * ) Notice: Subject to any disclaimer, the term of this patent is extended or adjusted under 35 U.S.C. 154(b) by 0 days.

(21) Appl. No.: 18/057,990

(22) Filed: Nov. 22, 2022

(65) Prior Publication Data
US 2024/0165814 A1    May 23, 2024

(51) Int. Cl.
| B25J 9/16 | (2006.01) |
| B25J 5/00 | (2006.01) |
| B25J 13/08 | (2006.01) |
| H02S 30/10 | (2014.01) |

(52) U.S. Cl.
CPC ............ B25J 9/1687 (2013.01); B25J 5/005 (2013.01); B25J 9/1697 (2013.01); B25J 13/089 (2013.01); H02S 30/10 (2014.12)

(58) Field of Classification Search
CPC ........ B25J 9/1687; B25J 5/005; B25J 9/1697; B25J 13/089; H02S 30/10
USPC ........................................................ 700/117
See application file for complete search history.

(56) References Cited

U.S. PATENT DOCUMENTS

| 10,429,487 | B1* | 10/2019 | Fowe | G01S 5/0289 |
| 2011/0303262 | A1* | 12/2011 | Wolter | F24S 25/11 |
| | | | | 136/251 |
| 2019/0134822 | A1* | 5/2019 | Clemenzi | H02S 20/32 |
| 2021/0115642 | A1* | 4/2021 | Almy | E02D 7/06 |
| 2021/0364632 | A1* | 11/2021 | Sagalovich | G05D 1/0278 |
| 2021/0379757 | A1* | 12/2021 | Schneider | B66F 11/04 |
| 2021/0379767 | A1* | 12/2021 | Kang | B25J 9/1679 |
| 2022/0356667 | A1* | 11/2022 | Almy | F24S 25/617 |

FOREIGN PATENT DOCUMENTS

| CN | 214729182 U | * 11/2021 |
| KR | 20220122272 A | * 9/2022 |

OTHER PUBLICATIONS

Casey, Thomas, Brian Guimond, and James Hu. "Underwater vehicle positioning based on time of arrival measurements from a single beacon." Oceans 2007. IEEE, 2007. (Year: 2007).*

* cited by examiner

Primary Examiner — Mohammad Ali
Assistant Examiner — Joshua T Sanders
(74) Attorney, Agent, or Firm — Cittone Demers & Arneri LLP; James P. Demers (57) ABSTRACT

The invention provides a system of mobile robotic devices configured to install the posts, racks, and photovoltaic (PV) panels of a solar farm. The invention also provides a computer command system (CCS) to direct the robotic devices for installation of the posts, racks, and panels with optimum speed and efficiency.

11 Claims, 4 Drawing Sheets

AUTOMATED SOLAR FARM CONSTRUCTION

RELATED APPLICATIONS

There are no related applications.

FIELD OF THE INVENTION

This invention relates to robotic construction methods, in particular to methods and apparatus for the mechanized installation of solar panel arrays.

BACKGROUND

Large-scale photovoltaic (PV) arrays ("solar farms") for power generation are being deployed in increasing numbers, as demand for renewable, carbon-free energy is growing rapidly. The largest of these can cover many square kilometers, contain several million photovoltaic panels, and generate up to 3 GW of power. Construction of such massive installations is a complex, time-consuming, and labor-intensive process.

After site preparation—which may involve setting up stormwater management controls, and removal of trees, boulders, and other obstructions—the first step of construction normally involves driving a multitude of posts into the ground, to serve as the foundation for the "racking" of the photovoltaic (PV) panels. The racking process consists of attaching mounting racks to the posts, and then attaching the PV panels to the racks. Weather permitting, an experienced crew of about 20 workers can install 800-900 panels per day, around 42 panels per worker-day, and it can take several months just to get all the panels in place in the larger installations. Other tasks include the digging of trenches for underground wiring, and wiring what may be millions of connections, from the panels to the junction boxes that combine their DC output, and then to the inverters and transformers that render the electricity compatible with the local utility grid. Overall, construction of a large solar farm can take a year or more, at a cost of well over a million dollars for labor alone.

The repetitive nature of the work makes it amenable to automation, but to date there are no systems capable of mechanical assembly of solar farms. Mobile, mechanical post-positioning and post-driving devices are available, but their operation is still dependent on human operators and laborers. There remains a need for faster and more economical methods of construction of solar farms.

SUMMARY OF THE INVENTION

The invention provides a system comprising three types of mobile robotic devices, respectively adapted for the tasks of post driving, rack installation, and PV panel mounting. Each device tows a specialized trailer holding the posts, racks, or PV panels that the device installs. Optionally, electrical connections can be carried out by a robotic device as well, but the representative embodiments described herein contemplate manual installation of the electrical connections, wiring, junction boxes, and related equipment. Each rack is configured to be mounted on a single post, and each rack is preferably configured to carry a single PV panel. The posts, racks, and PV panels may be industry-standard items, or they may be specially configured to be more easily and rapidly picked up, placed, and affixed by the robotic devices of the invention. The invention contemplates the use of specialized posts, racks, and panels that are adapted for robotic installation, and provide for "plug-and-play" construction, where electrical connections are established simultaneously with assembly of the components.

One aspect of the invention is the sequence of assembly, which is designed for maximum speed and efficiency, and which takes into account the re-loading of the various trailers as needed without interrupting the overall work flow. Another aspect of the invention is navigation method by which the robotic devices locate themselves on the site, and thereby properly locate the components that they are to install.

The invention also provides for Real-Time Operational Data (RTOD) to provide a basis for efficiency analysis, performance improvement, and debugging processes, as well as remote monitoring of the operation of the array via wired or wireless (satellite) Internet.

DETAILED DESCRIPTION OF THE INVENTION

In broad terms, the invention provides a robotic solar array construction system, suitable in particular for the category of arrays that comprise a plurality of posts, racks mounted on the posts, and photovoltaic (PV) panels mounted on the racks. One component of the system is a post-driving mobile robotic device, comprising a multi-axis robotic arm, a post driver, and a towed trailer bearing posts to be installed. A second component is a rack-mounting mobile robotic device, comprising a multi-axis robotic arm, having a towed trailer bearing racks to be installed. A third component is a panel-mounting mobile robotic device, comprising a multi-axis robotic arm, having a towed trailer bearing PV panels to be installed.

The post-driving mobile robotic device is configured to place posts at locations specified in a digital map of the solar array. The locations of the posts in the digital map may be identified by their positions relative to the location of a pilot post; and the post-driving mobile robotic device is preferably configured to navigate to those locations by positioning itself relative to the pilot post. The rack-mounting and panel-mounting mobile robotic devices may also be configured to navigate to those locations by positioning themselves relative to the pilot post, or they may navigate by detecting the installed posts upon which they are operating. A mobile robotic device of the invention may be configured to position itself relative to the pilot post via an on-board LiDAR (Light Detection and Ranging) system, an on-board machine vision system, or via inertial navigation.

A mobile robotic device of the invention may also be configured to place the posts at geographic coordinates specified in the digital map, and may be configured to position itself at said coordinates via an enhanced GPS method. Suitable enhanced GPS methods include but are not limited to the use of an RTK (real time kinematic) base station or an NTRIP (Networked Transport of RTCM) (Radio Technical Commission for Maritime Services, a standard for transmitting differential corrections in GPS (DGPS) and GNSS systems via Internet Protocol.) There are numerous WADGPS (Wide-Area DGPS) or SBAS (Satellite-Based Augmentation Systems) services which may also be employed.

The invention also provides a method for the automated construction of a solar array. The method comprises a number of steps, including the preparation of a digital map specifying the locations of the posts in the array, and the storage of at least a portion of the digital map in a computer-readable memory. The digital map is readable by a computer processor, and the memory and processor are incorporated into the post-driving mobile robotic device described above. The processor reads the map and directs the post-driving mobile robotic device to the first of the post installation locations, where the device installs one of the posts. The processor, reading the map, then directs the post-driving mobile robotic device to subsequent post installation locations, where the device installs additional posts. The process continues until the full plurality of posts in the array has been installed.

As noted above, the locations of the posts in the digital map may be identified by their positions relative to the location of a pilot post, or by their geographic coordinates, and the post-driving mobile robotic device will navigate accordingly.

The system of the present invention designed to minimize worker injury caused by repetitive and dangerous labor, to reduce construction costs, and to accelerate solar farm construction. Through automation, cost savings can be realized by reducing construction time by 50%, reducing the number of man-hours required for construction, and achieving a more uniform structure of the solar farm. Additional savings may be realized through associated improvements in the efficiency of maintenance, as described in more detail below.

The invention contemplates that the installation site has been cleared and graded, and that post locations have been previously mapped out. Some sites may require the discovery of underground stones or other obstacles, typically via GPR (ground-penetrating radar), and either the removal of these obstacles or the modification of post location maps. Markers indicating post locations may be placed on the ground manually; alternatively the post-driving mobile robotic device may locate itself relative to an internally-stored map via methods including but not limited to GPS, LiDAR, laser range-finding, and computer vision, or combinations thereof.

In order to generate the internally-stored map, a physical or digitized site map is prepared, in which the post locations have been determined based upon the geography of the site and the spacing requirements associated with panel size and service lane requirements. The layout of solar arrays, and the preparation of digital maps of solar arrays, are well-established arts. The digitized map is normally gridded with a coordinate system, and the positions of the posts in the array are represented as points in the coordinate system. The use of Geographic Information System (GIS) software in construction of the digital map is preferred, in order to simplify the numerous possible uses of the map in offices and at the physical construction site. A GIS package employs a relational database of location information and object information (in the present invention, identifiers and characteristics of individual solar panels), and can relate array coordinates (e.g. sub-array, row and post numbers) to geographical (e.g. latitude and longitude) coordinates on the ground and to x-y or polar coordinates referenced to the pilot posts, the latter of which can be directly utilized by the robotic installation devices as described below.

In a preferred embodiment of the invention, the coordinates of the post locations, relative to a pilot post, are further referenced to the rows and columns of a spreadsheet. In this embodiment, the digitized map is gridded with an x-y coordinate system, which need not be Cartesian (i.e. the axes need not be perpendicular.) In particular, if the physical layout of the posts is on a non-Cartesian grid, it may be advantageous to use a coordinate system with correspondingly tilted axes. The x-y coordinates of each post can then be referenced to row and column values of the cells in a spreadsheet, e.g., the eighth post in the fifth row is associated with the eighth column in the fifth row of a spreadsheet map. The spreadsheet map is self-referenced, i.e. it is independent of on-site geographical coordinates, orientation, terrain slope and panel spacing and dimensions—elements which may be present elsewhere in the spreadsheet. A representative spreadsheet map of a small sub-array is illustrated below:

TABLE 1

Sample Construction Map

|    | A  | B | C | D | E   | F | G  | H | I | J | K | L | M | N | O | P | Q | R | S | T | U |
|----|----|---|---|---|-----|---|----|---|---|---|---|---|---|---|---|---|---|---|---|---|---|
| 1  | 1  |   |   |   |     | 0 |    |   |   |   |   |   |   |   |   |   |   |   |   |   |   |
| 2  | 2  | 1 | 2 | 1 | 0   | 1 | 9  | 0 | 1 | 1 | 1 | 1 | 1 | 1 | 1 | 1 | 1 | 0 | 0 | 0 | 0 |
| 3  | 3  |   |   |   |     | 0 |    |   |   |   |   |   |   |   |   |   |   |   |   |   |   |
| 4  | 4  | 2 | 1 | 2 | 0   | 1 | 9  | 1 | 1 | 1 | 1 | 1 | 1 | 1 | 1 | 1 | 0 | 0 | 0 | 0 | 0 |
| 5  | 5  |   |   |   |     | 0 |    |   |   |   |   |   |   |   |   |   |   |   |   |   |   |
| 6  | 6  | 3 | 2 | 3 | 0   | 1 | 12 | 0 | 1 | 1 | 1 | 1 | 1 | 1 | 1 | 1 | 1 | 1 | 1 | 1 | 0 |
| 7  | 7  |   |   |   |     | 0 |    |   |   |   |   |   |   |   |   |   |   |   |   |   |   |
| 8  | 8  | 4 | 2 | 4 | 0   | 1 | 12 | 0 | 1 | 1 | 1 | 1 | 1 | 1 | 1 | 1 | 1 | 1 | 1 | 1 | 0 |
| 9  | 9  |   |   |   |     | 0 |    |   |   |   |   |   |   |   |   |   |   |   |   |   |   |
| 10 | 10 | 5 | 1 | 5 | 15  | 1 | 14 | 1 | 1 | 1 | 1 | 1 | 1 | 1 | 1 | 1 | 1 | 1 | 1 | 1 | 1 |
| 11 | 11 |   |   |   |     | 0 |    |   |   |   |   |   |   |   |   |   |   |   |   |   |   |
| 12 | 12 | 6 | 1 | 6 | 15  | 1 | 13 | 1 | 1 | 1 | 1 | 1 | 1 | 1 | 1 | 1 | 1 | 1 | 1 | 1 | 0 |
| 13 | 13 |   |   |   |     | 0 |    |   |   |   |   |   |   |   |   |   |   |   |   |   |   |
| 14 | 14 | 7 | 1 | 7 | −10 | 1 | 14 | 1 | 1 | 1 | 1 | 1 | 1 | 1 | 1 | 1 | 1 | 1 | 1 | 1 | 1 |

Column contents in the above sample map are as follows:

A: Horizontal (X axis) row number

B: Element Sequence # of PV Array

C: Horizontal position X

D: Vertical position Y

E: Tilt (in degrees) of array relative to X axis

F: Array exists in row? (1 = y, 0 = n)

G: No. of panels in row

H-U: Post to be installed at this position? (1 = y, 0 = n)

In this map, the odd-numbered rows represent service lanes, where the robotic devices operate during construction, and where maintenance vehicles will later operate. The map indicates, in column F, that no posts are to be installed in these rows. Columns C and D locate the first post in each physical row. Rows 10, 12 and 14 are to be laid out at an angle to the other rows, as indicated in column E.

Table 1 illustrates only the map component of the spreadsheet; other rows and columns will contain information about the size and spacing of the panels, the depth/height of the posts, the actual orientation of the rows, and the location of the pilot post, from which the robotic installation devices will measure directions and distances to the post installation points. The pilot post may be at position H2 in the map, which (as shown in the illustrated embodiment) can be set aside for non-installation of a PV panel, or may be located at some nearby position that serves as the real-world origin of the sub-array grid.

While installing on uneven terrain, such as hills or mountains, the maximum ground slope relative to horizontal can be indicated in the map, and be subject to adjustment by the plant layout designer. During operation, the slope will be detected by a sensor within each robotic device; this information is used by the controlling software to adjust the power delivered to the drive mechanism. A warning signal is triggered should the slope values exceed the maximum inclination, and the forward motion of the robotic device(s) is paused and a warning message is displayed to the supervising on-site construction manager. The tolerance percentage of the designated inclination normally is plus/minus 5%, and can be adjusted by the plant layout designer.

Figure 1:
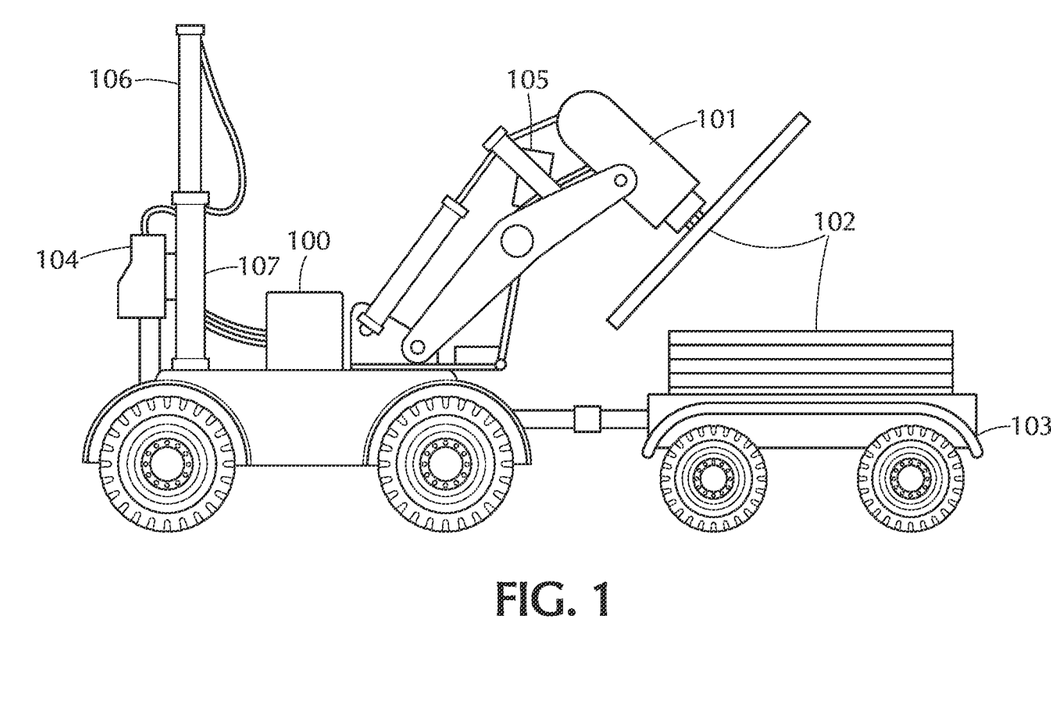
FIG. 1 shows a post-driving mobile robotic device, with a towed trailer bearing posts to be installed.

FIG. 1 illustrates a representative post-driving mobile robotic device. The device comprises a post placement tool 101 mounted on a multi-axis motorized arm 105, and a post driving tool 104, which may also be on a multi-axis arm or may be raised and lowered by a hydraulic tower 106 on a rotating mount 107. These tools are mounted on an autonomous or semi-autonomous tracked or wheeled vehicle 100. The vehicle tows a trailer 103, which carries a supply of posts 102 to be installed. This vehicle may be, for example, a modification of the autonomous sheet post driving device described in N. Melenbrink and J. Werfel, "Autonomous Sheet Pile Driving Robots for Soil Stabilization," 2019 *International Conference on Robotics and Automation (ICRA)*, 2019, pp. 339-345. The mobile robots marketed by Universal Field Robots (UFR) of Queensland, Australia as models E20C and E35C are tracked robotic vehicles which are available equipped with a multi-axis arm capable of picking posts from a towed trailer, and these robots are particularly suitable for the present invention. The arm 105, guided by stereo camera vision and operated by a microcontroller running UFR's Autonomy™ software, is capable of sensing a post on the trailer, gripping it, and manipulating it into a vertical position, at a pre-selected position where the post driving tool 104 can drive it into the ground. This vehicle is preferably equipped with LiDAR (light detection and ranging) technology suitable for precise geolocation in the field, as described further below. Mobile devices capable of simultaneously placing and driving posts are also described in U.S. Pat. No. 8,752,876, which is incorporated herein by reference in its entirety.

Software for reading and following the installation site GIS or spreadsheet maps may be written in a high-level language such as JAVA™, and this software can provide navigational input to the Autonomy software. Alternatively, DriveWorks™ software and the DRIVE OS™ (NVIDIA Corp, Santa Clara, CA), which are designed specifically for autonomous vehicle development, can be employed as the software environment. DriveWorks™ provides a sensor abstraction layer, sensor plug-ins, data recording and I/O support, as well as a deep neural network (DNN) framework.

According to one embodiment of the invention, posts 102 are picked from the trailer 103 by post placement tool 101, and placed on the ground in the desired locations by the multi-axis arm 105, and then driven into the ground to a pre-selected depth using post driving machinery 104, which is lifted by hydraulic tower 106 or else is mounted to a second multi-axis arm. Lightweight gasoline or pneumatic post driving devices are well known in the art, and can readily be mounted to and manipulated by a multi-axis robotic arm.

The use of machine vision to guide the picking and placement of work pieces and the manipulation of tools is a well-known technology, and is routinely used, for example, in the auto industry. Representative examples are found, for example, in U.S. Patent Publication Nos. 2018/0126553 and 2018/0126547, and U.S. Pat. No. 10,926,416 and 10,657,419. The disclosures of these applications and patents are incorporated herein by reference in their entireties.

A preferred machine vision system is the use of paired cameras, with software construction of a three-dimensional representation for use by the multi-axis arm. Once a post is placed and driven, the vehicle moves to the next post location and repeats the process, as described further below.

In a preferred embodiment, the post-driving device (and, optionally, the other robotic devices of the invention) follows a pre-determined map of post placement locations, which is uploaded to the device's on-board computer-readable storage prior to post installation. In this embodiment, the device must be able to locate itself accurately in the field, for example using a LiDAR-based computer vision system. In an alternative embodiment, the ground is surveyed and post locations are identified and marked in advance with markers placed on the ground, which are then recognized optically and used as targets by the post-driving device.

In yet another embodiment, the post-driving device (and, optionally, the other robotic devices of the invention) may rely upon enhanced GPS methods to locate itself with centimeter accuracy. Such methods include, for example, the use of a real time kinematic (RTK) base station, which can be installed at the site prior to initiation of construction, or an NTRIP (Networked Transport of RTCM via Internet Protocol) service, if the site is within range of such a service. The receivers and signal processing hardware for RTK and NTRIP are commercially available, and can readily be installed on and integrated with the robotic devices of the invention. Suitable RTK and NTRIP devices, specifically adapted for use by autonomous vehicles, include the VBOX™ system marketed by Racelogic Ltd. of Buckingham, UK.

In a preferred embodiment, a pilot post is first driven into the ground at a pre-determined location. The physical placement of the pilot post on the ground may be established by enhanced GPS, or by a marker on the ground, with or without the supervision of an on-site surveyor or technician. The pilot post may be provided with a high-contrast target or a reflective element, e.g. a retroreflective surface, that is highly visible to a machine vision or LiDAR device, which enables the post-driving device to measure off distances and directions from the pilot post, and to install a sub-array of posts based on a stored map keyed to the pilot post location. The entire solar installation can comprise any number of pilot posts and their associated sub-arrays. The bearing direction from the pilot post may be established by a bearing-determination means such as Inertial Measurement Unit (IMU) and Attitude Heading Reference System (AHRS) or a GNSS compassing technique, optionally in combination with inertial navigation (GNSS/INS). Alternatively, an initial heading can be established by a human operator using conventional surveying methods, with inertial navigation (referenced to the initial heading) relied upon thereafter. Suitable navigation systems are commercially available, for example the VN-100 and VN-200 series from VectorNav Technologies LLC of Dallas, Texas.

In alternative embodiments, distance and direction traveled may be determined by measurements taken from the drive system of the post-driving device, or from an inertial guidance system, but machine vision or LiDAR-based range-finding using the pilot post as a reference is the preferred method. The size of the resulting sub-array is normally determined by the maximum distance from the pilot post at which the robotic devices can locate themselves with acceptable accuracy, or by the effective communication range of the panel monitoring device installed on the pilot post, as described below. The post-driving device may optionally locate itself relative to one or more already-installed posts, in order to extend the operating range and increase the size of the sub-array. In alternative embodiments, the post-driving device may rely upon moving a pre-set distance (the panel spacing distance), in the correct direction, to navigate to the position of the next post to be driven. In such embodiments, the post-driving device can minimize cumulative errors through the use of machine vision, to maintain proper spacing relative to nearby, previously-installed posts.

Figure 2:
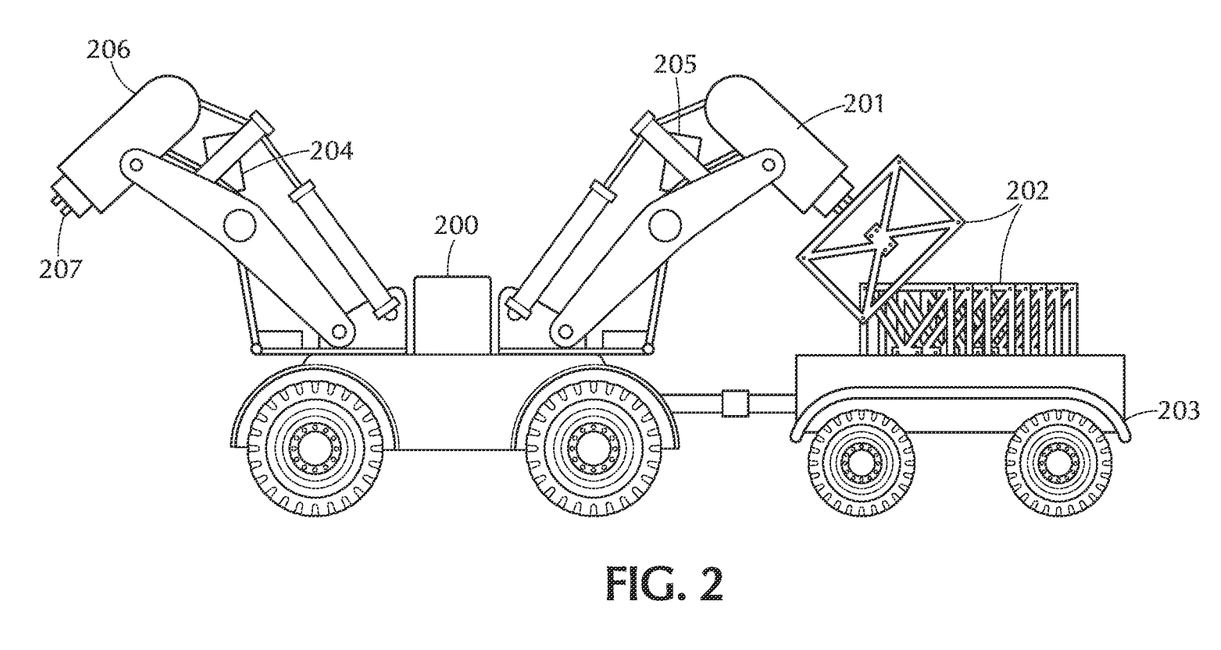
FIG. 2 shows a rack-mounting mobile robotic device, with a towed trailer bearing racks to be installed.

The second stage of construction involves mounting the frames to the posts. For this task, a rack-mounting mobile robotic device is employed. FIG. 2 illustrates a representative rack-mounting device, which comprises at least one multi-axis motorized arm 205 mounted on an autonomous or semi-autonomous tracked or wheeled vehicle 200. The rack-mounting device may use the same navigational methods and devices as described above for the post-driving device, but with the posts having already been installed, the device's computer vision system may be relied upon for precise location relative to each successive post. The same vehicle and multi-axis arms upon which the post-driving device is based will generally be suitable as the basis of the rack-mounting mobile robotic device as well. The vehicle tows a trailer 203, which carries a supply of racks 202 to be installed. A supply of bolts, straps, or other mounting hardware is carried as necessary to the particular mounting system being employed. Briefly, a rack 202 is picked from the trailer 203 by a rack-picking device 201 mounted on a first multi-axis arm 205, and placed on a post in the appropriate position. A second multi-axis arm 204 bears a tool holder 206 to which an appropriate fastening tool 207 is mounted. It should be understood that in FIG. 2, element 207 is a schematic representation of a generic tool, rather than any specific tool. Tool 207 may be, for example, a magnetic socket wrench which can hold a bolt, a powered screwdriver, or a vise capable of manipulating a clamp. Tool 207 fastens the rack to the post by any appropriate rack-mounting means, such as bolts, screws, clamps, straps. Soldering or welding may be employed as alternatives, in which case tool 207 may comprise a torch and a holder for solder or a welding rod, or spot-welding electrodes. Bolts, screws, or straps are preferably pre-attached to the racks, so that tool 207 does not need to pick and place these elements, but only needs to lock them into place, for example by tightening bolts or cinching clamps. Side-of-pole and top-of-pole mounts may be used, but top-of-pole mounts are preferred for their relative ease of installation.

The mounting process is analogous to robotic assembly on an auto assembly line, and the appropriate tools, hardware and software are readily available and adaptable to the requirements of the present invention. The invention is expected to initially employ commercially-available post and rack hardware, and industry-standard mounting methods, as the most economical embodiment, but as the invention becomes more commonly used, it is anticipated that hardware and methods specially adapted for rapid and reliable robotic mounting will become preferred. Placement of the racks atop the posts, and affixing them by driving together a friction joint, e.g. by driving home a tightly-fitting post cap or post insert, or racks that are placed on the posts and fixed in place via a single integrated clamp, are examples of such specialized embodiments.

Figure 3:
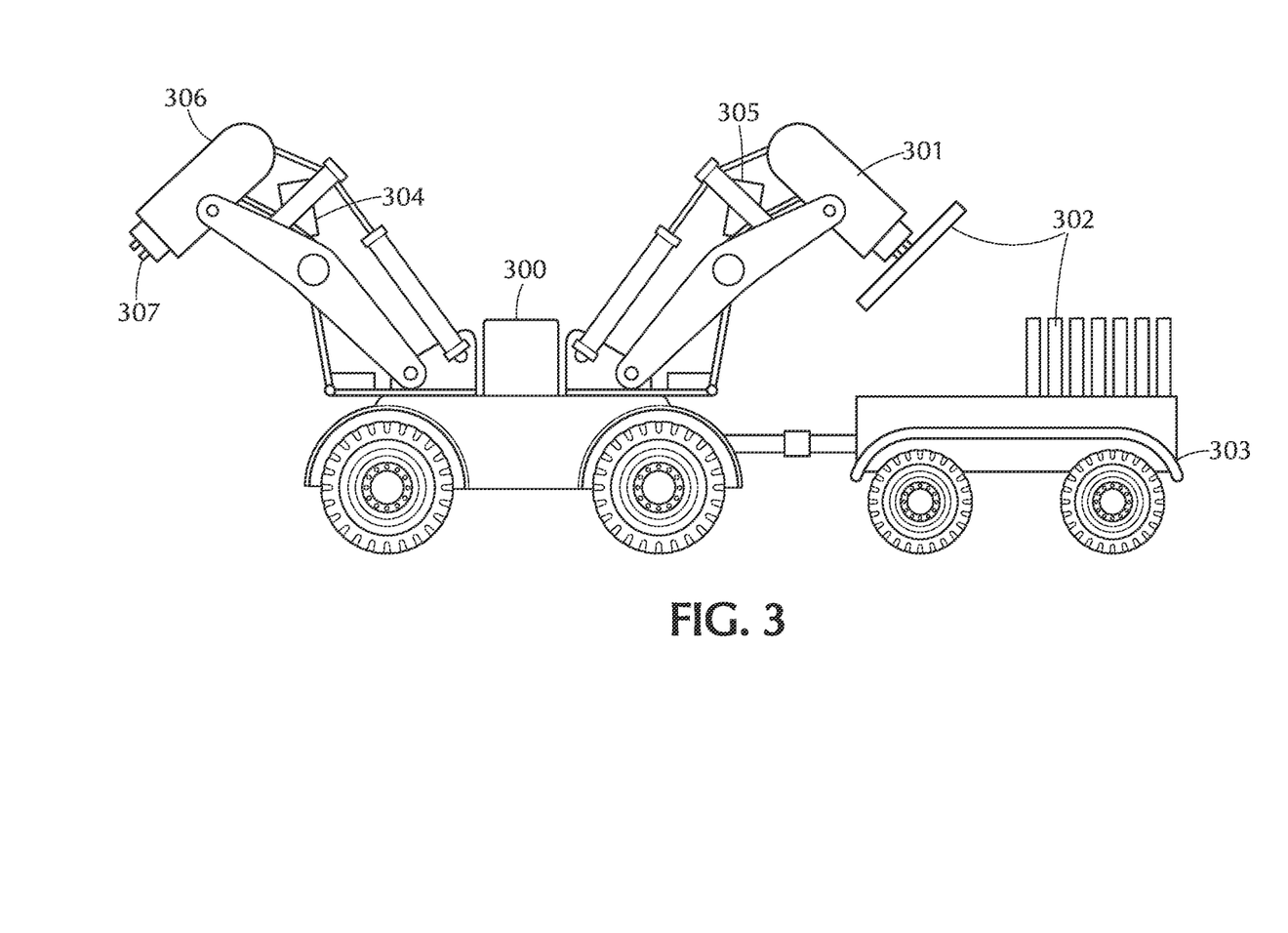
FIG. 3 shows a panel-mounting mobile robotic device, with a towed trailer bearing panels to be installed.

The third stage of construction involves attaching the PV panels to the racks. FIG. 3 illustrates a representative panel-mounting mobile robotic device suitable for this task. As with the post-driving and rack-mounting devices, the panel-mounting device comprises multi-axis motorized arms 304 and 305 mounted on an autonomous or semi-autonomous tracked or wheeled vehicle 300. The same vehicle and multi-axis arms upon which the post-driving and rack-mounting devices are based will generally be suitable as the basis of the panel-mounting mobile robotic device as well. As with the rack-mounting device, the panel-mounting device may use the same navigational methods and devices as described above for the post-driving device, but with the posts and racks having already been installed, the device's computer vision system may be relied upon for precise location relative to each successive rack.

The panel-mounting device vehicle 300 tows a trailer 303, which carries a supply of PV panels 302 to be installed, and as with the rack-mounting robotic device, a supply of bolts, straps, or other mounting hardware is carried as necessary to the panel mounting system being employed. Panels are picked from the trailer by a panel-positioning device 301, placed on a rack in the appropriate position, and fastened by panel-mounting means such as bolts, screws, clamps, straps, or welding. The panel-mounting device 301 may employ gripping tools and/or suction cups to take hold of the panels 302 and place onto the racks. Robotic handling systems capable of manipulating solar panels are known, and are employed in both the manufacturing and installation of solar panels. See, e.g., U.S. Patent Application Publication No. 2022/0069770, which is entirely incorporated by reference herein. This process, too, is analogous to robotic assembly on an auto assembly line, and again the appropriate tools, hardware and software are readily available and adaptable to the requirements of the invention.

A second multi-axis arm 304 bears a tool holder 306 to which an appropriate fastening tool 307 is mounted. It should be understood that in FIG. 3, element 307 is a schematic representation of a generic tool, rather than any specific tool. Tool 307 may be, for example, a magnetic socket wrench which can hold a bolt, a powered screwdriver, or a vise capable of manipulating a clamp. Tool 307 fastens the panel to the rack by any appropriate rack-mounting means, such as bolts, screws, clamps, straps. Soldering or welding may be employed as alternatives, in which case tool 307 may comprise a torch and a holder for solder or a welding rod, or spot-welding electrodes. Bolts, screws, or straps are preferably pre-attached to the racks and/or to the panels, so that tool 307 does not need to pick and place these elements, but only needs to lock them into place, for example by tightening bolts or cinching clamps.

Commercially-available PV panels, employing standard panel-mounting means and industry-standard mounting methods, will be the preferred embodiment initially, but specialized panels having panel-mounting means particularly adapted to rapid and reliable robotic installation, and mounting racks likewise adapted, are expected to be preferred for large-scale deployment. Preferred embodiments include PV panels that snap or latch into place on the racks, without additional bolts, brackets, straps or clamps. Suitable mounting systems include the magnetic PV panel mounts marketed by Cutting Edge Power Inc. of Missouri City, Texas, which require simple placement of the panels upon a steel rack, or upon steel mounting points affixed to an aluminum, plastic, or composite rack.

The final step in construction is the connection of the panels to electrical cables to form a completed array. This is expected to be done by manual labor, at least initially. An array may comprise from a hundred to a thousand panels, and the overall PV plant ("solar farm") may comprise any number of such arrays, depending on the intended nameplate capacity of the plant. The construction of electrical conditioning apparatus, for conversion of the PV output to an AC voltage suitable for transmission, is beyond the scope of the present description but is routine in the art. The wiring of panel sensors to the pilot post monitoring systems will also be carried out at this stage.

The pole-driving, rack-mounting and panel-mounting robotic device trailers are pre-loaded manually by technicians. Trailers may vary in capacity, for example 12, 20, or 24 each of poles, racks, and panels. Typically, each trailer will be loaded with at least the appropriate numbers of items for the row under construction, on a row-by-row basis, and trailer capacities will be sufficient for the maximum row length at the site. The loading may be carried out at a central facility on site, but is more preferably done in situ, by unloading components from trucks driven to the location at which installation is currently in progress.

Panels will be mounted as closely as practicable in a given row, with post spacing calculated accordingly. Rows may be separated by spacing sufficient for the travel of the robotic installation devices. In a representative example of the operation of the invention in this embodiment, as each robotic installation device completes its tasks in a given row, it proceeds to a pre-determined loading site where its trailer is manually re-loaded. The loading sites will typically be near the end of the row just completed, and will be moved along as the rows are constructed. The loading sites may be pre-programmed into the robotic devices; alternatively technicians may manually drive the devices to the loading site as part of the manual trailer-loading process. Ideally, the devices operate on a schedule such that the post-driving device can finish a row, have its trailer re-loaded, and be dispatched to the beginning of the next row, before the rack-mounting device following along behind finishes the row and, in turn, requires re-loading. The panel-mounting device likewise follows the rack-mounting device with a time interval that accommodates the loading of the racks into their trailer. The above scheme permits continuous operation of the robotic devices with a single crew of technicians.

In an alternative embodiment, all three robotic devices are allowed to complete their tasks in a given row prior to commencement of the subsequent row. This results in less-efficient, slower construction of the array, but permits each subsequent row to be more closely spaced relative to its previous row, as there is no need to allow space for passage of the robotic devices that are still at work on the previous row. In this embodiment, row spacing sufficient for maintenance of the array is all that is required, and a more densely populated array, with higher net production, can be constructed.

Each pilot post is preferably provided with one or more electronic monitoring devices that monitor the performance of the panels in the associated sub-array. The panels may have individual transmitters that wirelessly communicate performance data to the pilot post monitoring devices, or alternatively, sensors and fault-detection circuitry on the panels may be directly wired to the pilot post monitoring devices. Performance data for each panel, together with the identity and/or location of the panel, are transmitted from these pilot monitor devices to the central management office of the array. Each panel in the array may be assigned a unique ID code, which is stored by the pilot monitor device in an integrated circuit (IC) package, the contents of which are refreshable by the operator of the array. Preferably, each pilot monitoring device has a unique MAC (Media Access Control) address, and may be wired directly to a local area network (LAN), e.g. via Ethernet, or alternatively it may be equipped with a transceiver which is wirelessly interfaced with the LAN, which in turn may be connected to and accessible via the Internet. A pilot post may optionally serve as the mount for a PV panel, in addition to the monitoring and communication devices, if provisions are made for the post extending above the panel.

The present invention makes possible the use of self-propelled panel-cleaning robotic devices, built along the same lines as the robotic installation devices but having multi-axis arms provided with brushes and optionally with water sprayers and squeegees. These devices can navigate by reference to the pilot posts, or via enhanced GPS hardware, in the same way that the installation devices navigate.

During electricity-generating operations, the same spreadsheet-based map format as used in construction can be used to display and report the functional status of each panel in the array, and can be updated in real time as the panels report to their respective pilot monitor devices. An example is shown in Table 2 below:

TABLE 2

| Sample Status Map | | | | | | | | | | | | | | | | | | | | |
|---|---|---|---|---|---|---|---|---|---|---|---|---|---|---|---|---|---|---|---|---|
| A | B | C | D | E | F | G | H | I | J | K | L | M | N | O | P | Q | R | S | T | U |
| 1 | 1 | | | | 0 | | | | | | | | | | | | | | | |
| 2 | 2 | 1 | 2 | 1 | 0 | 1 | 9 | 0 | 1 | 1 | 1 | 1 | 2 | 1 | 1 | 1 | 0 | 0 | 0 | 0 |
| 3 | 3 | | | | 0 | | | | | | | | | | | | | | | |
| 4 | 4 | 2 | 1 | 2 | 0 | 1 | 9 | 1 | 1 | 1 | 1 | 1 | 1 | 1 | 1 | 0 | 0 | 0 | 0 | 0 |
| 5 | 5 | | | | 0 | | | | | | | | | | | | | | | |
| 6 | 6 | 3 | 2 | 3 | 0 | 1 | 12 | 0 | 1 | 1 | 1 | 1 | 1 | 1 | 2 | 1 | 1 | 3 | 1 | 0 |
| 7 | 7 | | | | 0 | | | | | | | | | | | | | | | |

TABLE 2-continued

Sample Status Map

| A | B | C | D | E | F | G | H | I | J | K | L | M | N | O | P | Q | R | S | T | U |
|---|---|---|---|---|---|---|---|---|---|---|---|---|---|---|---|---|---|---|---|---|
| 8 | 8 | 4 | 2 | 4 |   | 0 | 1 | 12 | 0 | 1 | 1 | 1 | 1 | 1 | 1 | 1 | 1 | 1 | 1 | 0 |
| 9 | 9 |   |   |   |   |   | 0 |   |   |   |   |   |   |   |   |   |   |   |   |   |
| 10 | 10 | 5 | 1 | 5 | 15 | 1 | 14 | 1 | 1 | 1 | 1 | 1 | 1 | 1 | 1 | 1 | 1 | 1 | 1 | 1 |
| 11 | 11 |   |   |   |   |   | 0 |   |   |   |   |   |   |   |   |   |   |   |   |   |
| 12 | 12 | 6 | 1 | 6 | 15 | 1 | 13 | 1 | 1 | 1 | 1 | 1 | 1 | 1 | 1 | 1 | 1 | 1 | 1 | 0 |
| 13 | 13 |   |   |   |   |   | 0 |   |   |   |   |   |   |   |   |   |   |   |   |   |
| 14 | 14 | 7 | 1 | 7 | −10 | 1 | 14 | 1 | 1 | 1 | 1 | 1 | 1 | 1 | 1 | 1 | 1 | 1 | 1 | 1 |

In the above map, numerical values in the panel position cells 1 indicates a PV panel functioning within specifications, 2 indicates a panel operating at low efficiency (generating power below specifications), and 3 indicates a non-functioning panel. Additional values can be assigned if desired, e.g. 4 might indicate that a non-compliant panel has been inspected, and further values might indicate whether repair or replacement is needed, whether repair or replacement has been scheduled, etc. Panel cleaning information (e.g. time since last cleaning, time until next cleaning) can likewise be recorded in the spreadsheet.

In a preferred embodiment, all installation operations are managed by an on-site management system. The management system, which will normally be under the supervision of the on-site construction manager, comprises a general-purpose computer in wireless communication with the robotic devices, having computer-readable storage carrying software configured to carry out the steps described herein, and carrying as well a digital map of the pilot post and panel post installation locations.

Figure 4:
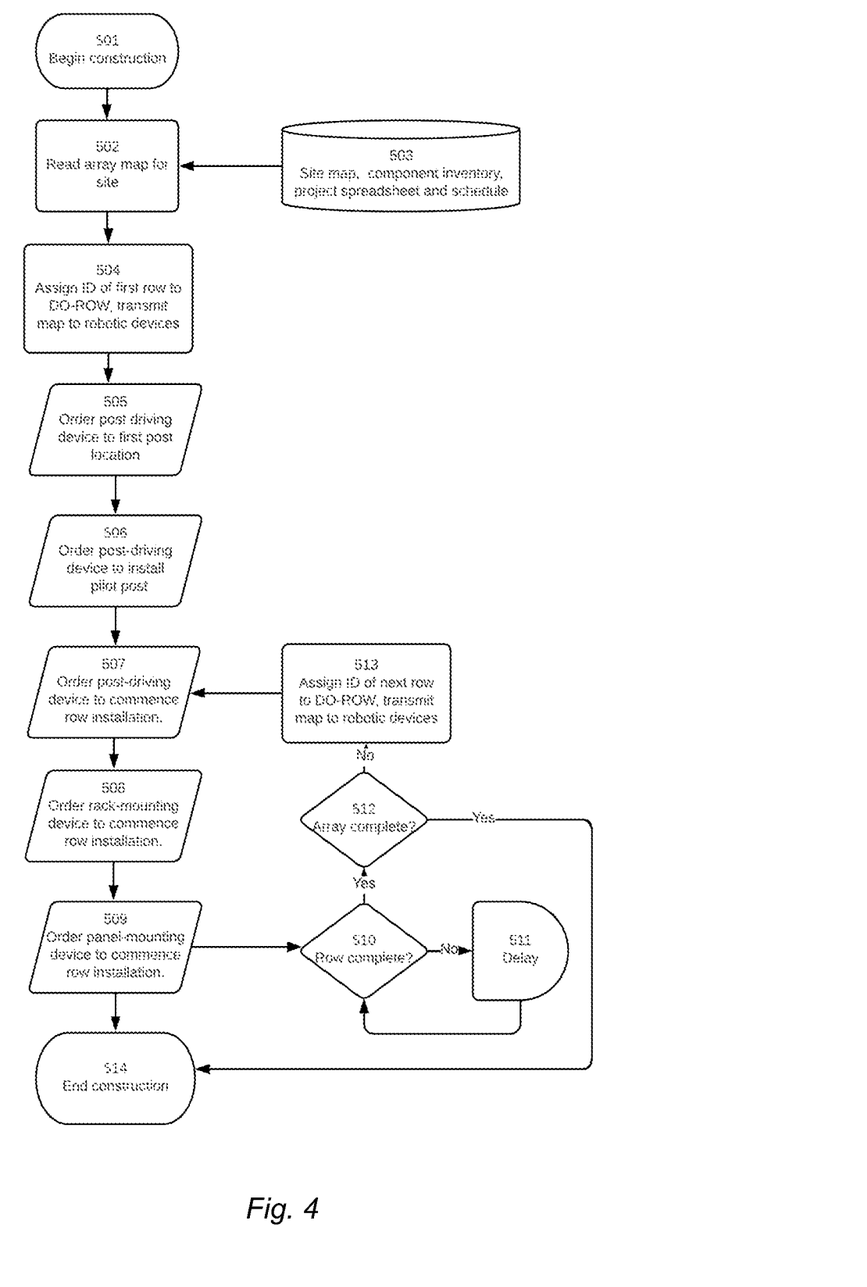
FIG. 4 is a flow chart of a representative automated assembly process.

An example of the roles of the manager and management system is outlined in the following construction steps, and illustrated in a software control command flow-chart in FIG. 4.

Step 1: The manager may attend to assembling the technicians, trailers, components, and robotic devices at the site, per information stored in a computer-readable medium (503), and initiating the operation of the management system for the sub-array to be constructed (step 501). The management system reads the plant construction map to find the first row of the designated sub-array (step 502), designates it as the "do-row" (the current row under installation) (step 504), and commands the post-driving robotic device to move to the first post location of the do-row (step 505).

Step 2: The post-driving robotic device goes to do-row location in the map, and is ordered to drive the first post into the ground at the specified location (step 506). If the first post is the pilot post for the sub-array, this information can be included in the map, and the post-driving robotic device may be directed to, or configured to recognize and select, the pilot post from the trailer. Alternatively, the pilot post may be installed by technicians using prior art methods, and used by the robotic installation devices to locate the placement of the remaining posts in the sub-array. This may be desirable when the pilot post is of a different design from (e.g., taller than) the panel-carrying posts. In most embodiments of the invention, technicians will attend to attaching the pilot and transceiver components to the pilot post.

Step 3: The post-driving robotic device is commanded to install all posts for the do-row (step 507).

Step 4: The rack-mounting robotic device is ordered to attach all frames to poles for the do-row (step 508).

Step 5: The panel-mounting robotic device is ordered to mount all panels to frames for the do-row (step 509). Installation of the do-row is completed.

Step 6: The management system monitors (step 510) the progress of the panel-mounting device at intervals (step 511) until it determines that the row is complete. Once the row is complete, the management system determines (step 512) if the sub-array is complete, i.e., if the row just completed is the final row in the sub-array. If not, it resets controls for the next row (step 513) and commands the robotic devices to repeat steps 2 through 6. If the sub-array is complete, an end-of-row job report is generated and saved (step 514) and the process ends. The construction manager then attends to re-loading the trailers as necessary, and to the movement of materials and machinery to the site of the next sub-array, where a new pilot post is to be driven. In alternative embodiments, most or all of the pilot posts can be installed prior to the beginning of robotic construction, with hands-on supervision of their precise locations.

The invention has been described herein by the presentation of certain examples and representative drawings. These descriptions are exemplary in nature and are not intended to disclose or define the limitations of the invention. Modifications, substitutions and equivalents of various elements of the invention, although not described or illustrated herein, will be apparent to those of skill in the art, and such variations are contemplated to fall within the scope of the following claims.

We claim:

1. A robotic solar array construction system, comprising:
   (a) a post-driving mobile robotic device, comprising a multi-axis robotic arm, a post driver, and a towed trailer bearing posts to be installed;
   (b) a rack-mounting mobile robotic device, comprising a multi-axis robotic arm, and a towed trailer bearing racks to be installed; and
   (c) a panel-mounting mobile robotic device, comprising a multi-axis robotic arm, and a towed trailer bearing PV panels to be installed;
   wherein said post-driving mobile robotic device is configured to place said posts at locations specified in a digital map of said solar array, said locations of said posts in said digital map being identified by a process consisting of
   (i) identifying their positions relative to the location of a single pilot post, and
   (ii) identifying their bearing direction from the single pilot post by one or more means selected from the group consisting of an inertial measurement unit, an attitude heading reference system, a GNSS compassing technique, and measurements taken from the robotic device's drive system;

and
wherein said post-driving mobile robotic device is configured to navigate to said locations by positioning itself relative to said single pilot post.

2. The robotic solar array construction system according to claim 1, wherein said post-driving mobile robotic device is configured to position itself relative to said pilot post via an on-board LiDAR system.

3. The robotic solar array construction system according to claim 1, wherein said post-driving mobile robotic device is configured to position itself relative to said pilot post via an on-board machine vision system.

4. The robotic solar array construction system according to claim 1, wherein said post-driving mobile robotic device is configured to position itself relative to said pilot post via inertial navigation.

5. The system according to claim 1, wherein said digital map is in the form of a spreadsheet.

6. A method for the automated construction of a solar array comprising a plurality of posts, racks mounted on the posts, and photovoltaic (PV) panels mounted on the racks, the method comprising:
  (a) preparation of a digital map specifying the locations of said posts in said array, said locations of said posts in said digital map being identified by their positions relative to the location of a single pilot post;
  (b) storage of at least a portion of said digital map in a computer-readable memory, the map being readable by a computer processor, the memory and processor being incorporated into a post-driving mobile robotic device comprising a multi-axis robotic arm, a post driver, and a towed trailer bearing posts to be installed;
  (c) said processor reading said map and directing said post-driving mobile robotic device to the first of said locations;
  (d) said post-driving mobile robotic device determining that is has arrived at said first location by a process comprising
    (i) identifying its position relative to the location of said single pilot post, and
    (ii) identifying its bearing direction from the single pilot post by one or more means selected from the group consisting of an inertial measurement unit, an attitude heading reference system, a GNSS compassing technique, and measurements taken from the robotic device's drive system,
  and installing one of said posts at said first location;
  (e) said processor reading said map and directing said post-driving mobile robotic device to a subsequent one of said locations;
  (f) said post-driving mobile robotic device determining that is has arrived at said subsequent location by a process comprising identifying its position relative to the location of said single pilot post, and installing another of said posts at said subsequent location; and
  (g) repeating steps (e) and (f) until said plurality of posts is installed.

7. The method according to claim 6, wherein said post-driving mobile robotic device is configured to position itself relative to said pilot post via an on-board LiDAR system.

8. The method according to claim 6, wherein said post-driving mobile robotic device is configured to position itself relative to said pilot post via an on-board machine vision system.

9. The method according to claim 6, wherein said post-driving mobile robotic device is configured to position itself relative to said pilot post via inertial navigation.

10. The method according to claim 6, wherein said locations of said posts in said digital map are identified by their geographic coordinates, and wherein said post-driving mobile robotic device is configured to position itself at said coordinates via an enhanced GPS method.

11. The method according to claim 10, wherein said enhanced GPS method is selected from the group consisting of RTK (real time kinematic) base stations, NTRIP (Networked Transport of RTCM via Internet Protocol) services, or SBAS (Satellite-Based Augmentation Systems).

* * * * *